United States Patent [19]

McLoughlin et al.

[11] 4,262,287
[45] Apr. 14, 1981

[54] AUTOMATIC SCAN FLOW METER MEANS

[75] Inventors: John McLoughlin, 92 Mobrey La., Smithtown, N.Y. 11787; Neocles Athanasiades, Setauket; Yehuda Rotblum, Lake Grove, both of N.Y.

[73] Assignee: John McLoughlin, Smithtown, N.Y.

[21] Appl. No.: 78,049

[22] Filed: Sep. 24, 1979

[51] Int. Cl.³ .............................................. G08B 21/00
[52] U.S. Cl. ................................. 340/606; 340/870.13; 73/195
[58] Field of Search ............ 340/606, 609, 802, 309.4, 340/309.5, 183, 184; 137/141, 551, 552, 557; 73/3, 195–197, 272 A; 235/94 R, 92 FL; 364/510

[56] References Cited

U.S. PATENT DOCUMENTS

| | | | |
|---|---|---|---|
| 3,144,046 | 8/1964 | Seesselberg | 73/195 |
| 3,340,525 | 9/1967 | Probert | 340/183 |
| 3,706,086 | 12/1972 | Farnsworth | 340/183 |
| 3,927,400 | 12/1975 | Knepler | 340/606 |
| 3,927,800 | 12/1975 | Zinsmeyer et al. | 235/92 FL |
| 3,949,207 | 4/1976 | Savary et al. | 364/510 |
| 4,146,750 | 3/1979 | Spiesman | 340/183 |

Primary Examiner—Gerald L. Brigance
Attorney, Agent, or Firm—James P. Malone

[57] ABSTRACT

Automatic scan flow meter means for systems of the type supplying a plurality of lines. A plurality of flow meters are each connected to a line and to a control panel. Display means are mounted on the control panel. Scanning circuit means are connected to scan the flow meters and sequentially display the flows from the flow meters.

12 Claims, 2 Drawing Figures

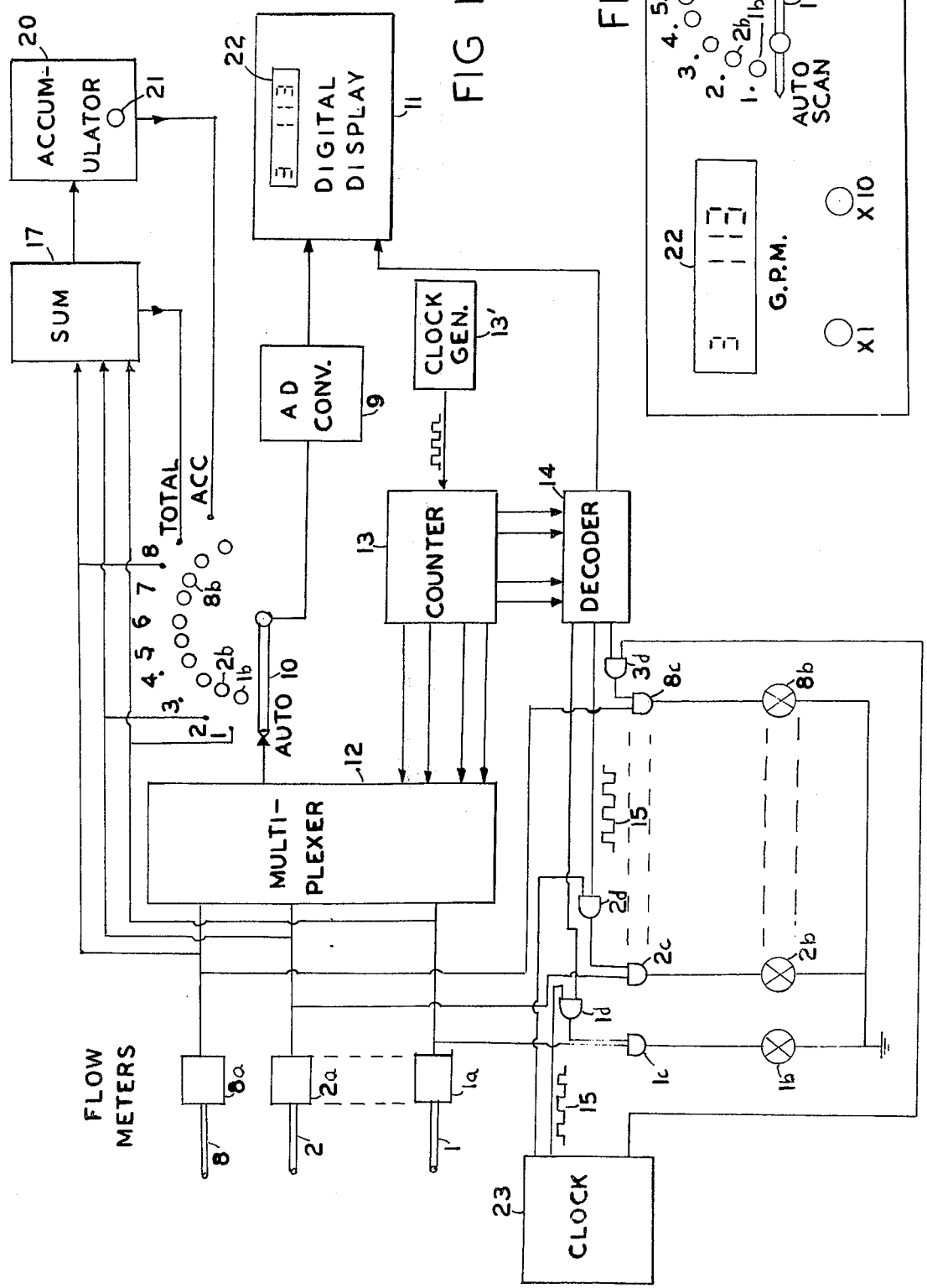

AUTOMATIC SCAN FLOW METER MEANS

This invention relates to flow meters and more particularly to means for sequentially displaying a plurality of flows on a control panel.

In many cases, for instance on fire truck pumpers, it is necessary or desirable to monitor liquid flows in a plurality of lines or hoses. In fire truck pumpers it is necessary to see that all hoses are getting proper flow at all times. If a hose flow fails, the fireman at the hoze nozzle will be endangered.

The present invention provides new and improved means to monitor a plurality of hose flows in gallons per minutes, in digital form, in a plurality of hoses or lines. The invention automatically scans up to eight discharges, displaying only those lines that are flowing water. The scanning system only displays discharges that are flowing. It skips discharges that are not flowing water. The flow reading is displayed for approximately ten seconds, before it advances to the next reading.

The singular most important information needed on the fireground is the knowledge of amount of water flowing. With this knowledge, a fire can be extinguished safely in the shortest possible time. Knowledge of the flow in each line can prevent hazardous situations since low or high flows place the nozzlemen in danger, while pressure alone will not supply the necessary information.

With the present invention, the pump operator knows exactly the flow in each line used. He can adjust the flow quickly without any additional calculations. A knowledge of total flow is necessary for the pump operator to prevent him from exceeding the supply.

Knowledge of amount of water used on a fire is important especially in training. It can be used to institute efficient fire fighting procedures. This cuts the amount of water being utilized, thus minimizing damage to property, as well as saving water.

The scanning flowmeter eases the pump operator's task since all the flow information is concentrated in a small area of the truck panel. A quick glance at the panel, updates the pump operator continuously on the situation of water flow. The big digital readout was utilized for viewing comfort. It can be seen at a distance of over 35 feet in broad daylight or darkness. An indication of lines flowing water is set by illuminating the light near the number of the hose line. To indicate which line is displayed, it's light will flash, so if it flashes on line number two, the operator knows that the flow reading on the display corresponds to line number two.

The scanning is done automatically. In automatic mode, the flows will be scanned in sequence, from line number one to line number eight, then 'total' flows. The accumulator will be displayed, if so desired, by turning the knob to "Accumulator" position.

Light emitting diodes or liquid crystal display illuminate to show which lines are flowing water and flashing to indicate which line is being displayed.

Manual override allows constant monitoring of any of the eight lines.

Total flow computer adds all flows and displays. Result is seen in next to last display in the scan cycle.

Totalizer setting adds all the flows from the beginning of a fire to the end, showing how much water was required to extinguish a fire.

Conventional fire truck pumpers do not have this type of information display.

Accordingly, a principal object of the invention is to provide new and improved flow meter means.

Another object of the invention is to provide new and improved flow meter means for fire trucks.

Another object of the invention is to provide new and improved automatic scan flow meter means for systems of the type supplying a plurality of lines comprising, a plurality of flow meters each connected to a line, a control panel, display means on the control panel, the flow meters being connected to the control panel, and means connected to scan the flow meters and sequentially display the flows from the flow meters.

FIG. 1 is a block diagram of an embodiment of the invention.

FIG. 2 is a front view of the display panel.

Referring to the FIG. 1, readings are taken from a plurality of conventional flow meters $1a$, $2a$ and $8a$, which are connected to a plurality of liquid flow lines 1, 2 and 8. The outputs of the flow meters are connected to the selector switch 10. The selector switch is connected to digital display 22 through analog to digital converter 9. The selector switch can select any line and display the amount of flow, for instance in gallons per minute on a digital display 11.

Adjacent to each position on the selector switch is a light emitting diode, $1b$, $2b$ and $8b$, etc., which provide indications as to which lines have flows.

In addition to the individual selection, by placing the selector switch on "AUTO", all the lines are automatically scanned and displayed. In order to do this the output of each flow meter is connected to a multiplexer 12 which automatically scans the flow meter readings and displays the information on the digital display 11. Corresponding lights $1b$, $2b$ and $8b$ are flashed at the same time to indicate which reading is being displayed. In order to provide the synchronized lights the multiplexer 12 provides the outputs to the counter 13, the output of which is connected to a decoder 14. The output of decoder 14 is connected to energize the lights $1b$, $2b$ and $8b$. Counter 13 counts the channels as they are scanned by multiplexer 12. The channel count is decoded by decoder 14 to flash the proper indicating light $1b$, $2b$, etc. The decoder 14 is a conventional 4–16 line decoder manufactured by Motorola, Inc., Texas Instrument Co., and others.

The lines which are flowing water will have an output from their flow meters which will be connected through the gate circuits $1c$, $2c$, etc. to light the respective indicator lights $1b$, $2b$, etc. When a particular line flow, for instance, line 1, is being sampled and displayed during scanning, then a pulse signal 15 is fed from the clock 23 via gates $1d$, $2d$, etc., which intermittently gates gate $1c$ to flash the lights $1b$, $2b$, etc. Decoder 14 connects pulse signal 15 through the proper gate $1c$, $2c$, $8c$, etc. If a line is not flowing water when it is sampled, it will advance increment from clock generator $13'$, and the counter will skip to the next channel or line.

The display is also capable of providing the total flow when the selector switch is turned to the "TOTAL" position 16. This information is provided from the summing circuit 17. Each flow meter $1a$, $2a$ and $8a$ has an input into the summing circuit.

The accumulated quantity of liquid expended during a particular time period may be selected by the switch 10 on "ACC" position 18. This information is obtained from the accumulator 20 which receives its input from the sum circuit 17 and counts or integrates the total amount over the desired time period. A reset button 21 is provided to reset the accumulator. The digital display is provided by or liquid crystal display in the display window 22. If desired, the display 22 may be arranged to also display the channel number together with the flow information, via line 14′.

The display may be modified with dividers, for instance, to display the quantities in units, tens, hundreds, etc.

It is claimed:

1. Flow display means for systems of the type having a plurality of flow lines comprising,
   a plurality of flow meters each connected to a flow line,
   a control panel,
   display means on the control panel,
   means to selectively connect the outputs of the flow meters to the display means and
   means connected to scan the flow meters and sequentially display the flows from the flow meters, and total flow.

2. Apparatus as in claim 1 wherein the display means is digital.

3. Apparatus as in claim 1 having means to indicate which flow is being displayed.

4. Apparatus as in claim 3 wherein the means to indicate is a flashing light.

5. Apparatus as in claim 3 wherein the means to indicate is a light emitting diode.

6. Apparatus as in claim 3 wherein the means to indicate is integrated into the flow quantity display.

7. Apparatus as in claim 3 having means to skip lines that are not flowing water.

8. Apparatus as in claim 3 wherein the means to indicate is a liquid crystal display.

9. Apparatus as in claim 1 having manual means to provide specific display of one flow line.

10. Apparatus as in claim 1 having cumulative measuring means to indicate the total amount of flow expended over a time period.

11. Apparatus as in claim 1 having means to indicate which lines have flows.

12. Apparatus as in claim 1 wherein the means to scan the flow meters is a multiplexer connected to the flow meters and to the display means.

* * * * *